United States Patent
Hung

(10) Patent No.: US 9,477,053 B2
(45) Date of Patent: Oct. 25, 2016

(54) OPTICAL COUPLING LENS AND OPTICAL COUPLING MODULE

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/585,635

(22) Filed: Dec. 30, 2014

(65) Prior Publication Data
US 2016/0041350 A1  Feb. 11, 2016

(30) Foreign Application Priority Data
Aug. 6, 2014  (TW) .............................. 103126884 A

(51) Int. Cl.
G02B 6/42  (2006.01)

(52) U.S. Cl.
CPC ........... *G02B 6/4214* (2013.01); *G02B 6/4206* (2013.01); *G02B 6/4246* (2013.01)

(58) Field of Classification Search
CPC ............................... G02B 6/42; G02B 6/4214
USPC ........................................................ 385/33
See application file for complete search history.

(56) References Cited

U.S. PATENT DOCUMENTS

| | | | | |
|---|---|---|---|---|
| 5,600,741 A | * | 2/1997 | Hauer | G02B 6/4204 385/14 |
| 5,872,662 A | * | 2/1999 | Lee | G11B 7/093 359/824 |
| 7,616,845 B2 | * | 11/2009 | Matsuoka | G02B 6/12007 385/14 |
| 8,532,449 B2 | * | 9/2013 | Mohammed | G02B 6/322 385/14 |
| 8,777,497 B2 | * | 7/2014 | Kim | G02B 6/4246 385/14 |
| 8,979,392 B2 | * | 3/2015 | Lin | G02B 6/4201 385/33 |
| 9,151,916 B2 | * | 10/2015 | Pommer | G02B 6/4201 |
| 9,213,156 B2 | * | 12/2015 | Amit | G02B 6/4215 |
| 2013/0259423 A1 | * | 10/2013 | Charbonneau-Lefort | G02B 6/4206 385/33 |
| 2014/0241672 A1 | * | 8/2014 | Isenhour | G02B 6/4206 385/79 |

\* cited by examiner

*Primary Examiner* — Kaveh C Kianni
(74) *Attorney, Agent, or Firm* — Zhigang Ma

(57) ABSTRACT

An optical coupling lens includes a first lens portion and a second lens portion. The first lens portion includes a substrate portion and a coupling portion. The substrate portion includes a supporting surface and a bottom surface opposite to the supporting surface, the bottom surface includes at least two lenses. The coupling portion is substantially a cuboid and includes at least one lens corresponding to one of the least two lenses and a top end surface. The top end surface defines a recess, the recess is arranged at least one reflecting portion. The second lens portion is formed on the supporting surface. The second lens portion includes a coupling surface and a fourth reflecting surface. The coupling surface is arranged an eighth lens corresponding to the other lens of the at least two lenses arranging on the bottom surface.

8 Claims, 7 Drawing Sheets

OPTICAL COUPLING LENS AND OPTICAL COUPLING MODULE

FIELD

The subject matter herein generally relates to fiber optic communications.

BACKGROUND

In the field of fiber optic communications, the optical coupling lens is configured to change a light path of a beam, yet an optical coupling lens usually can change light paths in only one direction.

BRIEF DESCRIPTION OF THE DRAWINGS

Implementations of the present technology will now be described, by way of example only, with reference to the attached figures.

DETAILED DESCRIPTION

Figure 1:
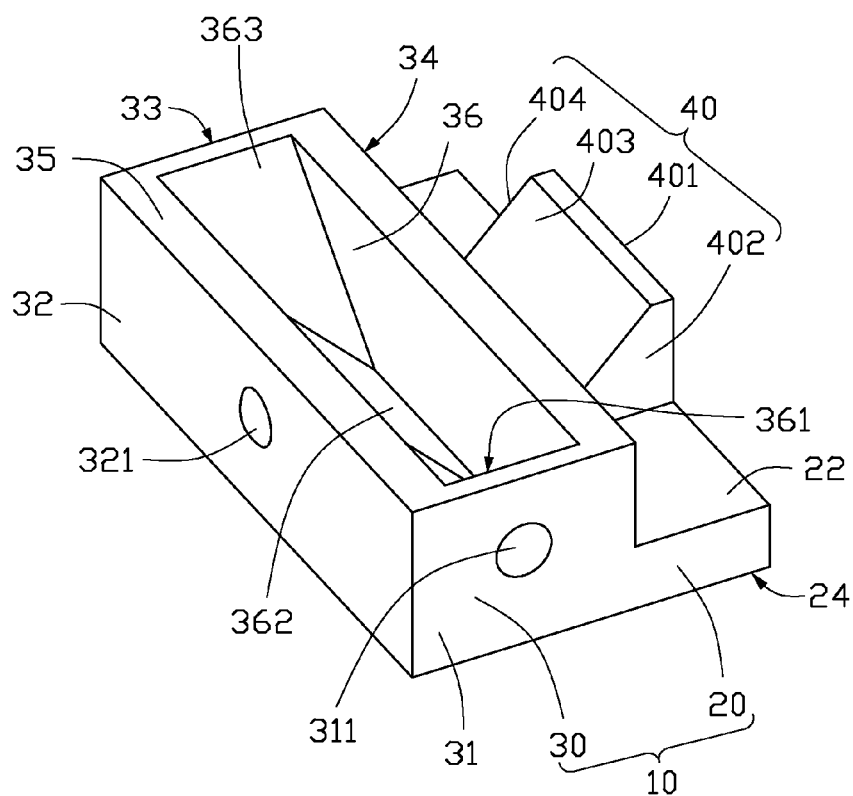
FIG. 1 is an isometric view of an optical coupling lens, according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 shows an optical coupling lens 100. The optical coupling lens 100 is made of transparent plastic. The optical coupling lens 100 includes a first lens portion 10 and a second lens portion 40. The first lens portion 10 and the second lens portion 40 are integrally formed.

The first lens portion 10 is substantially chair shaped. The first lens portion 10 includes a substrate portion 20 and a coupling portion 30 perpendicularly connected with the substrate portion 20. The substrate portion 20 includes a supporting surface 22 and a bottom surface 24 opposite to the supporting surface 22. The coupling portion 30 is substantially a cuboid and extends away from the supporting surface 22.

Figure 2:
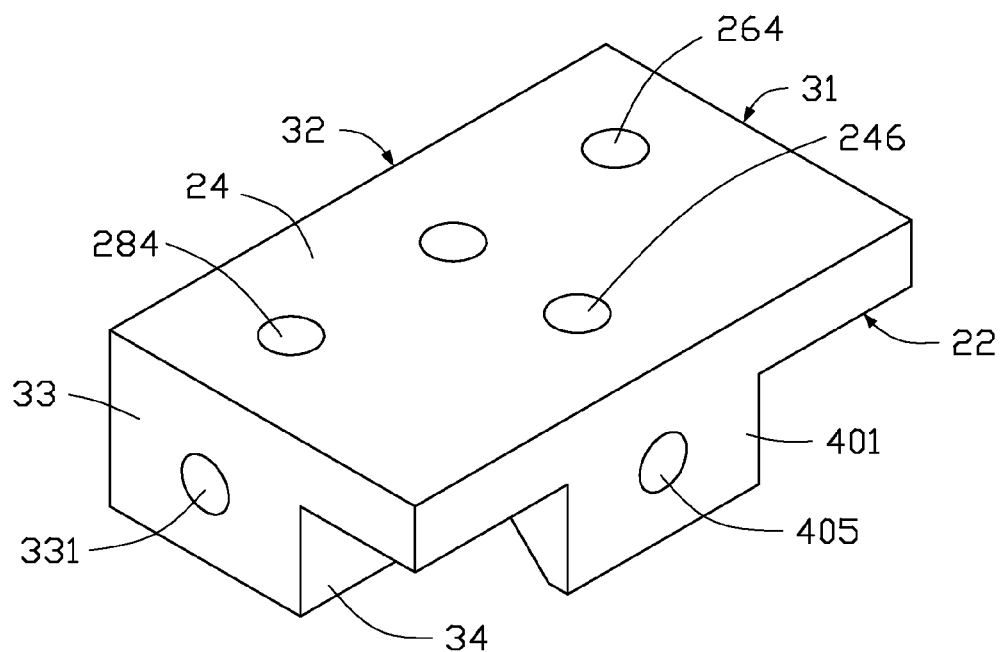
FIG. 2 is similar to FIG. 1, but viewed from another angle.
Figure 3:
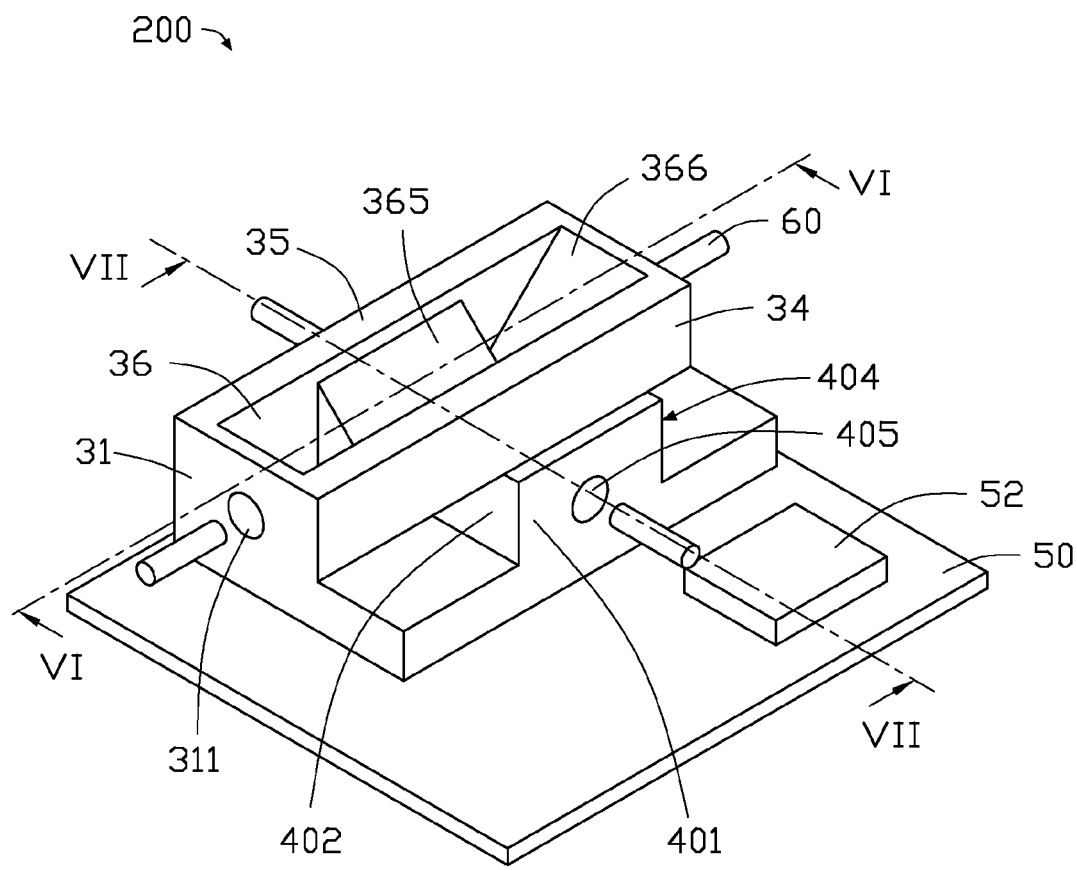
FIG. 3 is an isometric view of an optical coupling module, according to a second embodiment.

The coupling portion 30 includes a first side wall 31, a second side wall 32, a third side wall 33, a fourth side wall 34 and a top end surface 35. The first side wall 31, the second side wall 32, the third side wall 33, and the fourth side wall 34 are connected in sequence. The first side wall 31, the second side wall 32, the third side wall 33, and the fourth side wall 34 are perpendicular to the supporting surface 22. The top end surface 35 is parallel to the supporting surface 22. As shown in FIGS. 1-3, the first side wall 31 includes a first lens 311, the second side wall 32 includes a second lens 321, the third side wall 33 includes a third lens 331. The top end surface 35 defines a rectangular recess 36.

FIG. 1 illustrates that the coupling portion 30 includes a first reflecting portion 361, a second reflecting portion 362 and a third reflecting portion 363 and all of them are arranged in the recess 36. The second reflecting portion 362 is located between the first reflecting portion 361 and the third reflecting portion 363. The first reflecting portion 361 abuts an inner surface of the first side wall 31. The second reflecting portion 362 abuts an inner surface of the second side wall 32. The third reflecting portion 363 abuts an inner surface of the third side wall 33.

Figure 4:
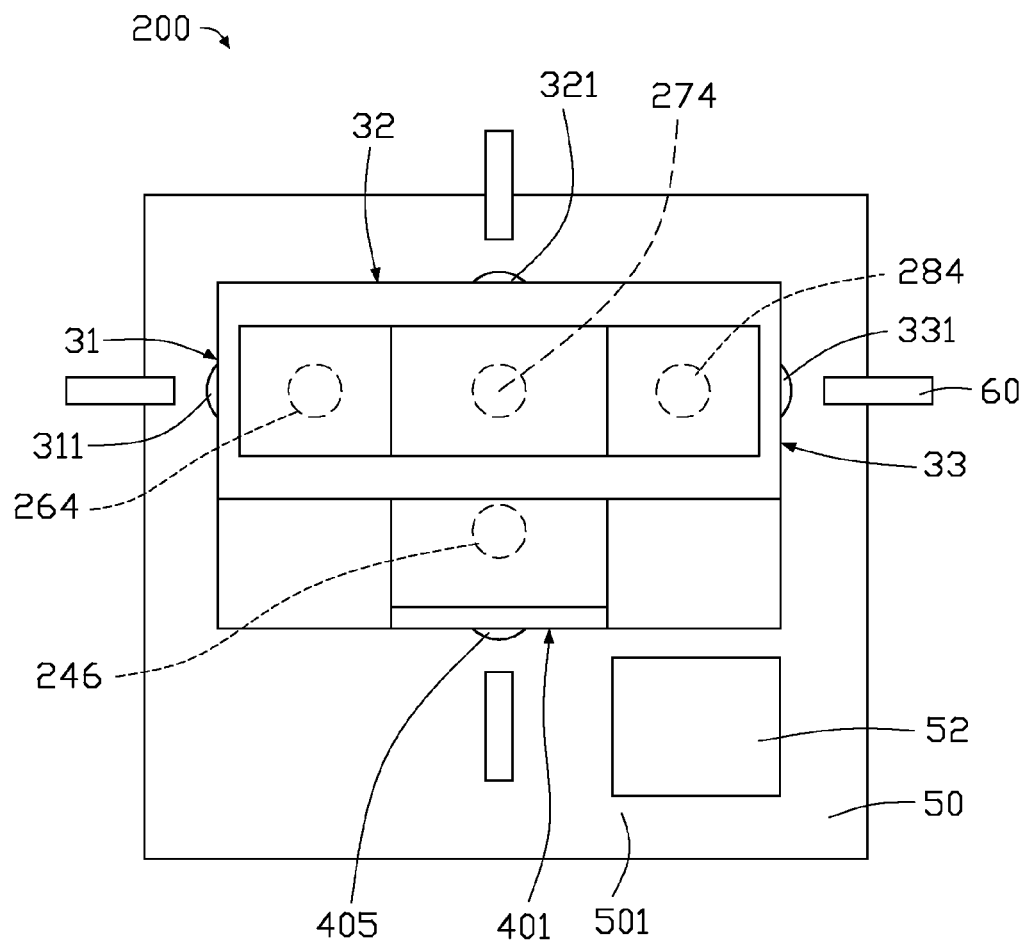
FIG. 4 is a top plan view of the optical coupling module.
Figure 5:
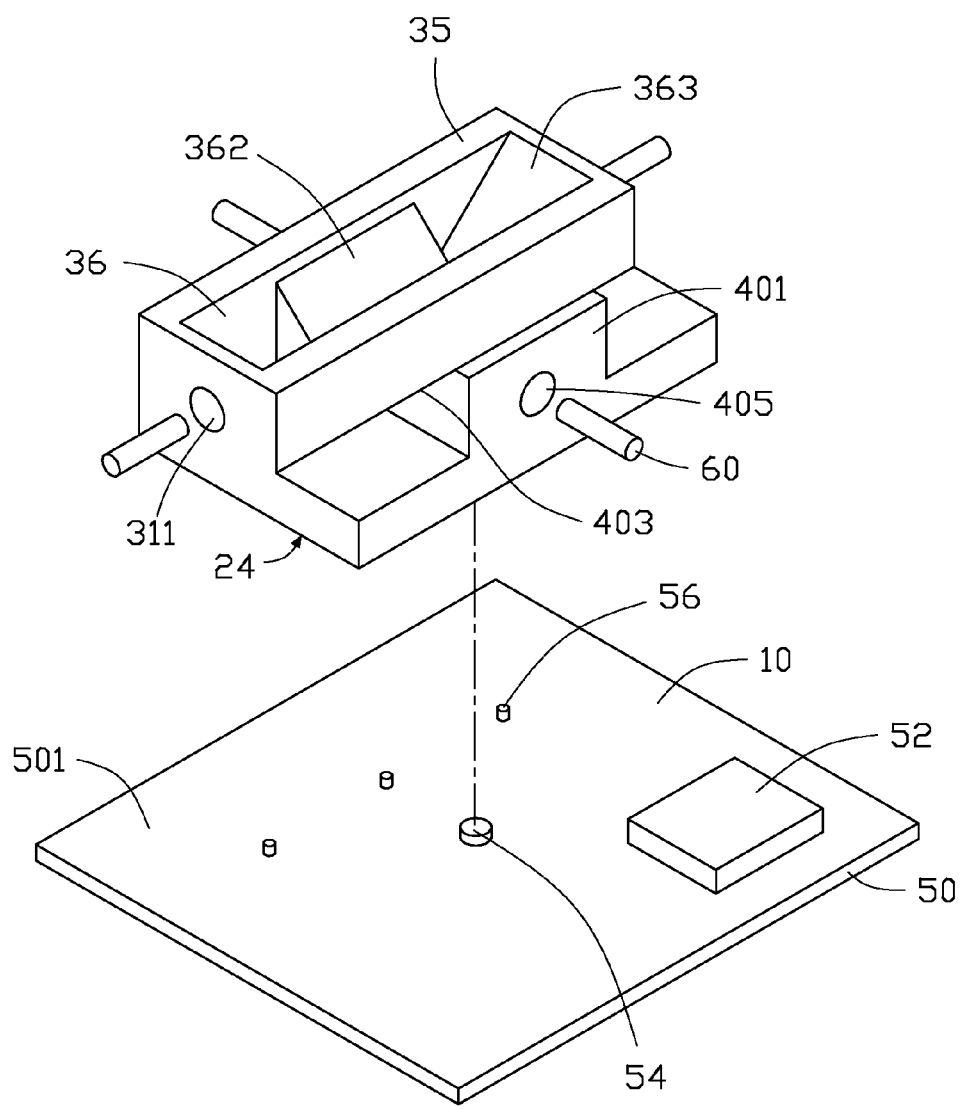
FIG. 5 is an exploded isometric view of the optical coupling module of FIG. 3.
Figure 6:
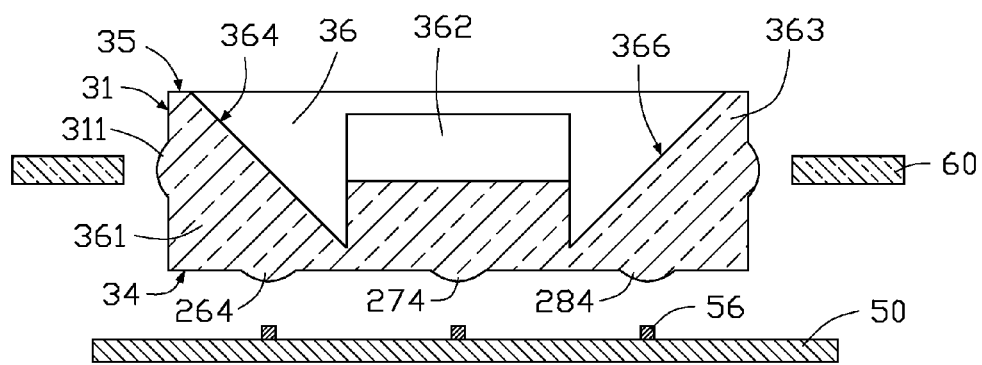
FIG. 6 is a cross-sectional view of the optical coupling module of FIG. 3, taken along line VI-VI.
Figure 7:
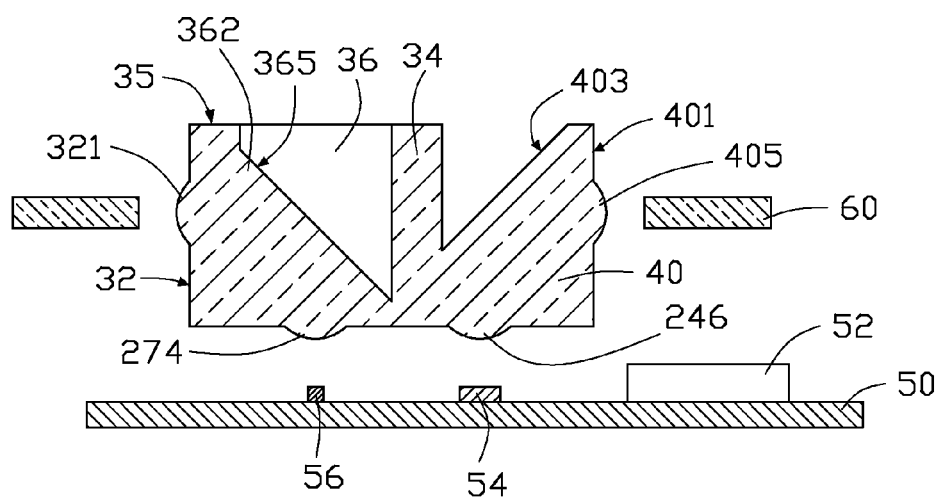
FIG. 7 is a cross-sectional view of the optical coupling module of FIG. 3, taken along line VII-VII.

FIG. 4 and FIG. 6 illustrate that the first reflecting portion 361 includes a first reflecting surface 364. The second reflecting portion 362 includes a second reflecting surface 365. The third reflecting portion 363 includes a third reflecting surface 366. An angle between the first reflecting surface 364 and the supporting surface 22 is about 45 degrees. An angle between the second reflecting surface 365 and the supporting surface 22 is about 45 degrees. An angle between the third reflecting surface 366 and the supporting surface 22 is about 45 degrees. Each reflecting surface is configured to reflect light beams from corresponding lens.

FIG. 2 illustrates that the bottom surface 24 is arranged with a fourth lens 264, a fifth lens 274, a sixth lens 284, and a seventh lens 246. Center points of the fourth lens 264, the fifth lens 274, and the sixth lens 284 are on a same line. Center points of the fifth lens 274 and the seventh lens 246 are on a same line. Line of the center points of the fourth lens 264, the fifth lens 274, and the sixth lens 284 is perpendicular to the line of the center points of the fifth lens 274 and the seventh lens 246.

FIG. 1, FIG. 2, FIG. 6 and FIG. 7 illustrate that the second lens portion 40 is formed on the supporting surface 22. The second lens portion 40 is substantially a triangular prism and includes a coupling surface 401, a first end surface 402, a fourth reflecting surface 403 and a second end surface 404 connected in sequence. The coupling surface 401 is perpendicular to the supporting surface 22 and perpendicularly connects the first end surface 402 and the second end surface 404. The fourth reflecting surface 403 is inclined relative to the supporting surface 22 and also inclined relative to fourth side wall 34. An angle between the fourth reflecting surface 403 and the supporting surface 22 is about 45 degrees. The coupling surface 401 includes a eighth lens 405. The eighth lens 405 is corresponding with the seventh lens 246.

FIGS. 4-7 illustrate an embodiment of an optical coupling module 200. The optical coupling module 200 includes the optical coupling lens 100, a printed circuit board 50 and at least one optical fiber 60. The printed circuit board 50 includes a mounting surface 501. The optical coupling lens 100 can be mounted with printed circuit board 50 using a method well known in the art. For example, the bottom surface 24 of the optical coupling lens 100 can be designed with at least one positioning hole (not shown), the mounting surface 301 can be designed with at least one positioning pole matching with the at least positioning hole (not shown). The number of the at least one optical fibers 60 can be three. The optical fibers 60 are aligned with the first, the second and the third lens 331 respectively. The optical fibers 60 are configured to transmit optical signal. The mounting surface 501 includes a chip 52, at least one light receiver 54 and at least one light emitter 56 electrically connected with the chip 52 respectively. In this illustrated embodiment, the mounting surface 501 includes one light receiver 54 and three light emitters 56. The light receiver 54 is aligned with the seventh lens 246. The three light emitters 56 are aligned with the fourth lens 264, the fifth lens 274, and the sixth lens 284 respectively. The light emitters 56 are laser diodes, and the light receiver 54 is a photodiode In use, an external optical signal is transmitted via the optical fiber 60 and projected onto the eighth lens 405, then reflected by the fourth reflecting surface 403 to the seventh lens 246, and finally received by the light receiver 54 and the light receiver 54 converts the optical signal into electrical signal. The chip 52 is configured for receiving the electrical signal, and transmits the electrical signal to the light emitters 56, the light emitters 56 convert the electric signal into optical signal, and couple the optical signal into the fourth lens 264, the fifth lens 274, and the sixth lens 284, and the optical signals are reflected by the first reflecting surface 364, the second reflecting surface 365 and the third reflecting surface 366 respectively, and emit out from the optical coupling lens 100 through the respective first lens 311, the second lens 321, and the third lens 331. In this way, the optical coupling lens 100 is used for changing a number of light paths of different optical signals at the same time.

In other embodiments, the mounting surface 501 can be arranged with one light emitter, and three light receivers, and a working principle is similar as described above.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical coupling lens comprising:
   a first lens portion comprising a substrate portion and a coupling portion perpendicularly connected with the substrate portion, the substrate portion comprising a supporting surface and a bottom surface opposite to the supporting surface, the bottom surface comprising at least two lenses, the coupling portion being substantially a cuboid and comprising at least one lens corresponding to one of the at least two lenses on the bottom surface and a top end surface parallel with the supporting surface, the top end surface defining a recess, the recess arranging at least one reflecting portion; and
   a second lens portion being formed on the supporting surface, the second lens portion being substantially a triangular prism and comprising a coupling surface and a reflecting surface, the coupling surface being perpendicular to the supporting surface, an angle between the coupling surface and the reflecting surface being 45 degrees, the coupling surface arranging an additional lens corresponding to the other lens of the at least two lenses arranging on the bottom surface;
   wherein the coupling portion comprises a first side wall, a second side wall, a third side wall, and a fourth side wall, the first side wall, the second side wall, the third side wall, and the fourth side wall being connected in sequence; and wherein the first side wall comprises a first lens, the second side wall comprises a second lens, and the third side wall comprises a third lens.

2. The optical coupling lens of claim 1, wherein the at least one reflecting portion comprises a first reflecting portion, a second reflecting portion and a third reflecting portion, the second reflecting portion is located between the first reflecting portion and the third reflecting portion, the first reflecting portion abuts an inner surface of the first side wall, the second reflecting portion abuts an inner surface of the second side wall, the third reflecting portion abuts an inner surface of the third side wall.

3. The optical coupling lens of claim 2, wherein the first reflecting portion comprises a first reflecting surface, the second reflecting portion comprises a second reflecting surface, the third reflecting portion comprises a third reflecting surface, the fourth side wall spaces apart the second reflecting surface and the reflecting surface, an angle between the first reflecting surface and the supporting surface is 45 degree, an angle between the second reflecting surface and the supporting surface is 45 degree, an angle between the third reflecting surface and the supporting surface is 45 degree.

4. The optical coupling lens of claim 3, wherein the at least two lenses comprises a fourth lens, a fifth lens, a sixth lens and a seventh lens, an central axis of the first lens is orthogonal to an central axis of the fourth lens, an central axis of the second lens is orthogonal to an central axis of the fifth lens, an central axis of the third lens is orthogonal to an central axis of the sixth lens.

5. The optical coupling lens of claim 4, wherein the bottom surface further comprising a seventh lens, center points of the fourth lens, the fifth lens, and the sixth lens are at a same line, center points of the fifth lens and the seventh lens are at a same line, line of the center points of the fourth lens, the fifth lens, and the sixth lens is perpendicular to the line of the center points of the fifth lens and the seventh lens.

6. The optical coupling lens of claim 1, wherein the first lens portion and the second lens portion are integrally formed.

7. The optical coupling lens of claim 1, wherein a height of the coupling portion is larger than a height of the substrate portion.

8. The optical coupling lens of claim 1, wherein the top end surface of the coupling portion is located above the supporting surface of the substrate portion.

* * * * *